United States Patent Office 2,793,716
Patented May 28, 1957

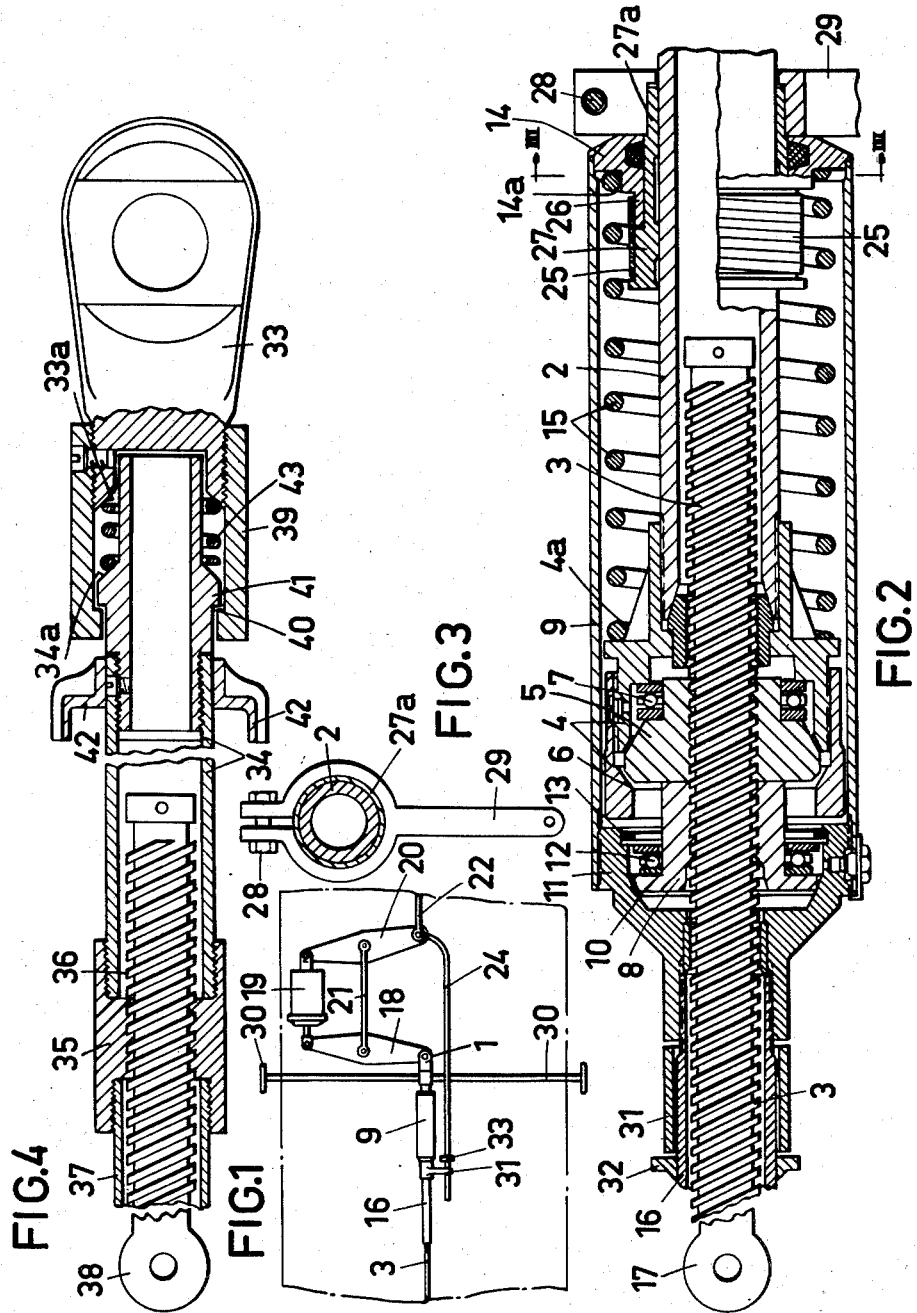

2,793,716

BRAKE SLACK ADJUSTER

Bert Henry Browall, Malmo, Sweden, assignor to Svenska Aktiebolaget Bromsregulator, Malmo, Sweden, a corporation of Sweden Application January 5, 1953, Serial No. 329,551

Claims priority, application Sweden October 22, 1951

3 Claims. (Cl. 188—196)

This invention relates to slack adjusters for the brake rigging of railway cars and like vehicles. More particularly the invention relates to slack adjusters of the kind comprising a two-part brake rod included in the brake rigging, and between the two parts of the brake rod a screw connection operable by means of a member that normally, that is with the brake in released position, is free to be rotated intentionally by hand for adjusting the two parts of the brake rod axially in relation to each other.

In a slack adjuster of the aforesaid kind the fact that the rotatable member of the screw connection in released position of the brake is free to be rotated intentionally by hand for adjusting the slack of the brake rigging makes it desirable to provide against unintentional rotation of said member under the action of vibrations or shocks for instance during the travel of the vehicle, since such unintentional rotation of said member may result in undesirable changes in the slack. The object of the invention is to provide simple and efficient means for avoiding such undesirable changes in the slack due to unintentional rotation of the rotatable member of the screw connection under the action of vibrations or shocks.

A simple means opposing unintentional rotation of the rotatable member of the screw connection of the slack adjuster is a frictional resistance to rotation between the rotatable member and a non-rotatable member of the slack adjuster, which resistance has to be overcome by the torque to be exerted on the rotatable member for rotating it intentionally by hand. With only such a frictional resistance to oppose unintentional rotation of the rotatable member there is the risk, however, that with the time a considerable unintentional rotation of the rotatable member from its manually adjusted position may result from cumulation of minute (individually neglectable) angular displacements of the rotatable member under the action of vibrations or shocks creating momentaneously in the rotatable member a torque as great as or greater than the torque that practically or conveniently can be required to be exerted on the rotatable member for rotating it intentionally by hand. For the purpose of eliminating this risk the invention provides means producing a frictional resistance to rotation between the rotatable member and a non-rotatable member of the slack adjuster, and yielding resiliently to the torque that on any angular displacement of the rotatable member in relation to the non-rotatable member of the slack adjuster arises between the rotatable member and the non-rotatable member due to the frictional resistance to rotation between them. In this combination the frictional resistance to rotation of the rotatable member of the screw connection need not be sufficiently great to prevent minute angular displacements of the rotatable member under the action of torques which the rotatable member may be subjected to momentaneously by the action of vibrations or shocks, since the rotatable member after such unintentional minute angular displacements thereof will be returned automatically into its manually adjusted position by said resilient means, whereby the risk for cumulation of such minute angular displacements of the rotatable member into a considerable angular displacement thereof from its manually adjusted position is fully eliminated.

In the preferred form of the invention said resilient means comprises a coiled spring inserted in a compressed state between the rotatable member and the non-rotatable member, so that the spring acts as a torque transmitting torsion spring between the rotatable member and the non-rotatable member and is frictionally engaged with at least one of them to produce a limited frictional resistance to rotation between them.

The invention is applicable not only to solely manually operable slack adjusters but also to automatic slack adjusters with provisions for operating the slack adjuster manually by rotating a part of the screw connection of the slack adjuster in relation to a non-rotatable part thereof by hand when the slack adjuster is in its normal position prevailing at released brake.

For a full understanding of the invention reference is to be had to the accompanying drawing illustrating constructional forms of slack adjusters including the preferred form of the invention. In the drawing:

Fig. 1 is a diagrammatic fragmental plan view of a conventional brake rigging mounted beneath the underframe of a railway car indicated by dash and dot lines, which brake rigging includes an automatic slack adjuster with provisions for manual operation thereof when in its shown normal position prevailing at released brake.

Fig. 2 is a fragmental longitudinal section of the slack adjuster shown in Fig. 1.

Fig. 3 is a cross section on line III—III in Fig. 2.

Fig. 4 is a longitudinal section of a slack adjuster operable solely by hand.

Figs. 1–3 show a type of automatic slack adjuster which automatically reduces the slack when it has become too large due, for instance, to wear of the brake shoes, and which in its shown normal position prevailing at released brake is operable by hand for increasing the slack to make possible or to facilitate removal of worn-out brake shoes and mounting of new ones, or to restore the slack to correct value when it has become too small due, for instance, to renewal of worn brake shoes. This slack adjuster comprises a two-part brake pull rod, one part of which, having a jaw 1 (Fig. 1) at one end, comprises a tubular rod 2, whereas the other part comprises a screw threaded spindle 3 of a high lead so as to be non-selflocking. The spindle 3 is inserted in the tubular rod 2 through the end thereof remote from the jaw 1. Housed in a housing 4 on the tubular rod 2 is a nut 5, called the coupling nut, which is screwed on the spindle 3 and coacts with a seat 6 in the housing 4 for axially coupling the spindle 3 to the tubular rod 2 in the direction for transmitting the braking power between the two brake rod parts 2 and 3 on braking. An antifriction thrust bearing 7 permits rotation of the coupling nut 5 on axial displacement of the spindle 3 in the opposite direction in relation to the tubular rod 2. On the screw threaded spindle 3 there is also screwed a nut 8, called the feed nut, which is housed in a tubular operating member 9 axially displaceable on the tubular rod 2. The feed nut 8 coacts with a seat 10 in an end piece 11 in one end of the operating member 9 for locking the spindle 3 to the operating member 9 on axial displacement thereof on the tubular rod 2 in the direction in which the spindle 3 is to be axially displaced in relation to the tubular rod 2 to reduce the slack, and through an antifriction thrust bearing 12 with an abutment 13 in the end piece 11 of the operating member 9 to permit the feed nut to be axially displaced on the spindle 3 by the operating member 9 on axial displacement thereof on the tubular rod 2 in the other direction. The operating member 9 is biased into its shown normal axial position on the tubular rod 2 by a compressed coiled spring 15 acting between the housing 4 on the tubular rod 2 and an end piece 14 in the other end of the operating member 9. In the end piece 11 there is secured a tube 16 surrounding the spindle 3 to protect its threads from dirt. In its outer end the spindle 3 has a jaw 17. The jaws 1 and 17 are for the connection of the two-part brake rod 2, 3 in the brake rigging which in the conventional form shown in Fig. 1 comprises a cylinder brake lever 18 connected at one end to the push rod of a brake cylinder 19, a floating brake lever 20, a connecting rod 21 between the brake levers 18 and 20, and brake pull rods extending from the brake levers 18 and 20 to the usual brake equipments at the two ends of the vehicle. The brake pull rod connected to the cylinder lever 18 consists of the two-part brake rod 2, 3, and the brake pull rod connected to the floating lever 20 is designated 22 in Fig. 1. The automatic slack adjuster includes control means operating automatically in dependence on the stroke of the brake on braking for axially displacing the operating member 9 on the tubular rod 2 against the action of the spring 15. In the constructional form shown in Fig. 1 said control means comprises an abutment 23 on a control rod 24 connected to the floating lever 20. On braking, said abutment 23 and the two-part brake rod 2, 3 move in relation to each other, whereby the operating member 9 can be displaced against the action of the spring 15 by being acted upon by the abutment 23.

As far as now described the automatic slack adjuster shown in Figs. 1 and 2 is well known in the art. Beyond the known art the automatic slack adjuster herein shown includes certain improvements, whereby the operating member 9, when in its shown normal position prevailing at released brake, is rotatable by hand and, when rotated, takes the two nuts 5 and 8 on the spindle 3 along in the rotation to produce a slack adjusting axial displacement of the two non-rotatable brake rod parts 2 and 3 in relation to each other. Since these improvements have been fully described and claimed in a separate application which I am filing simultaneously with the present application and as a continuation-in-part of my U. S. application Ser. No. 286,113, filed May 5, 1952, now abandoned, they will be described in the following only to the extent necessary for the understanding of the showing of Figs. 1–3. On return of the operating member 9 into its normal position under the action of the spring 15 at the release of the brake after a braking operation during which the operating member 9 was displaced against the action of the spring 15 by the control means 23, 24, the feed nut 8 abuts the coupling nut 5 and pushes it against the antifriction bearing 7, so that the force which the spring 15 exerts on the operating member 9 is transmitted by the end piece 11, the seat 10 therein, the feed nut 8, the coupling nut 5, and the antifriction bearing 7 to the housing 4. It follows that, when the operating member 9 is in its normal position shown in Fig. 2, the coupling nut 5 is pressed against the feed nut 8 and the latter against the seat 10 by the compressed spring 15 which thus is utilized not only for its usual purpose of biasing the operating member 9 into its normal position but also for holding the coupling nut 5 out of engagement with its seat 6 and for holding the feed nut 8 clutched by friction to its seat 10 in the operating member 9 and for holding the coupling nut 5 clutched by friction to the feed nut 8 and thereby to the operating member 9, so that the two nuts 8 and 5 will take part as a unit in a rotation of the operating member 9 on the non-rotatable brake rod parts 2 and 3.

It is often sufficient to have the operating member 9, when in normal position, rotatable by hand on the tubular rod 2 in one direction only, namely in the direction in which the two nuts 5 and 8 have to be screwed on the spindle 3 for increasing the slack. In such cases a simple form of ratchet mechanism may be used for rotating the operating member 9, and Figs. 2 and 3 show such a ratchet mechanism comprising a one way clutch housed within the operating member 9 and comprising a coiled clutch spring 25 fitting axially aligned cylindrical surfaces on a collar 26 integral with the end piece 14, and on a sleeve 27 rotatably mounted on the tubular rod 2 and having a projecting end 27a on which there is clamped, by means of a bolt 28 (Fig. 3), an arm 29. The operating member 9 can be rotated in the desired direction by rocking the arm 29. Handle bars 30 (Fig. 1) connected to the arm 29 and extending to the sides of the car may be provided, by means of which the arm 29 can be rocked by hand to and fro through a limited angle to operate the slack adjuster in the slack increasing direction, without requiring the workmen to go under the car. In order that the control means 23, 24 shall form no hindrance to rotation of the operating member 9 the latter is provided with an arm 31 for the coaction with the abutment 23, which arm 31 is axially nondisplaceable in relation to the operating member 9 and freely and easily rotatable about the longitudinal axis thereof and has a hole for receiving and guiding the rod 24. Preferably the arm 31 is mounted for easy rotation on the protective tube 16 between a stop ring 32 thereon and the end piece 11.

The fact that both the nuts 5 and 8 are free to rotate together with the operating member 9 in the normal position thereof prevailing at released brake, makes it necessary or at least desirable to provide against unintentional rotation of the operating member and thereby of the nuts 8 and 5 under the action of vibrations or shocks during the travel of the vehicle. The simplest manner of opposing unintentional rotation of the operating member 9 is by means of a frictional resistance to rotation between the operating member 9 and the non-rotatable tubular rod 2, which resistance has to be overcome by the torque to be exerted on the operating member 9 for rotating it intentionally by hand. With only such a frictional resistance to rotation between the operating member 9 and the tubular rod 2 there is the risk, however, that with time a considerable unintentional angular displacement of the operating member 9 on the tubular rod 2 may result from cumulation of minute (individually neglectable) angular displacements of the operating member under the action of vibrations or shocks creating momentaneously in the operating member 9 a torque as great as or greater than the torque that practically or conveniently can be required to be exerted on the operating member 9 for rotating it intentionally by hand. In accordance with the invention this risk is eliminated by the combination with a frictional resistance to rotation between the operating member 9 and the non-rotatable tubular rod 2, of means yielding resiliently to the torque that on any angular displacement of the operating member 9 in relation to the non-rotatable tubular rod 2 arises between the two due to the frictional resistance to rotation between them. In the construction illustrated in Fig. 2 the compressed coiled spring 15 is utilized to produce the frictional resistance to rotation between the operating member 9 and the non-rotatable tubular rod 2, and as the means yielding resiliently to the torque that on any rotation of the operating member in relation to the tubular rod 2 arises between the two due to the frictional resistance to rotation between them. To this end the compressed coiled spring 15 is arranged to act as a torque transmitting torsion spring between end supports 4a and 14a for the same on the housing 4 of the tubular rod 2 and on the end piece 14 of the operating member 9, respectively, and at least one end of the spring 15 is frictionally engaged with its support, the other end of the spring, if not frictionally engaged with its support, being non-rotatably engaged therewith. Any desirable value of the frictional resistance to rotation between any of the ends of the spring 15 and its support can be obtained by a suitable shape, for instance conical, of the support. The frictional resistance offered by the spring 15 to rotation between the operating member 9 and the tubular rod 2 can be given a relatively low value without risk for any significant unintentional rotation of the operating member under the action of vibrations or shocks. The spring 15, acting as a torsion spring between the operating member and the tubular rod 2, will yield resiliently to such minute angular displacements of the operating member 9 as may occur momentaneously under the action of vibrations or shocks. Thus the operating member 9 after such minute angular displacements thereof will be returned into its manually adjusted position by the spring 15, whereby the risk for cumulation of such minute angular displacements into a considerable angular displacement of the operating member 9 from its manually adjusted position is eliminated.

The slack adjuster shown in Fig. 4 is operable solely by hand and comprises a two-part brake rod one part of which, having at one end a jaw 33, comprises a tubular rod 34 and a nut 35 secured to the tubular rod 34 at the end thereof remote from the jaw 33. The other part of the two-part brake rod comprises a screw threaded spindle 36 inserted into the tubular rod 34 by the nut 35 being screwed onto the spindle 36. To the end of the nut 35 remote from the jaw 33 is secured a tube 37 surrounding the spindle 36 to protect the threads thereof from dirt. The outer end of the spindle 36 is provided with a jaw 38. The jaws 33 and 38 are for the connection of the slack adjuster as a brake rod in the brake rigging. With the slack adjuster mounted in the brake rigging and with the brake in released position the tubular rod 34 is rotatable by hand for screwing the nut 35 on the spindle 36 for axially displacing the two brake rod parts 34 and 36 in relation to each other for adjusting the brake slack. To this end there is a rotary connection between the tubular rod 34 and the jaw 33. This rotary connection is by means of a sleeve 39 secured to the jaw 33 and surrounding the adjacent end portion of the tubular rod 34 and having an internal abutment or seat 40 coacting with an external abutment or seat 41 on the tubular rod 34 for holding the latter axially to the jaw 33 in the direction for transmitting the brake power between them on braking. Suitable projections 42 are attached to the rod 34 to facilitate rotation thereof by hand. A compressed coiled spring 43 is housed between the tubular rod 34 and the sleeve 39 and acts between the jaw 33 and the tubular rod 34 which are provided with preferably conical seats 33a and 34a, respectively, for the ends of the spring 43. At least one end of the spring 43 is frictionally engaged with its seat, the other end of the spring 43, if not frictionally engaged with its seat, being non-rotatable in relation thereto.

On braking the friction arising between the coacting abutments 40 and 41 under the action of the braking stress effectively locks the tubular rod 34 and thereby the nut 35 against rotation in relation to the jaw 33. At released brake, when there is no braking stress in the brake rod, there is a certain limited frictional resistance to rotation of the rotatable tubular rod 34 and the nut 35 thereon. The major part of this resistance which has to be overcome on intentional rotation of the rod 34 by hand for adjusting the brake slack, results from the friction between the compressed spring 43 and one of its seats 33a and 34a. It follows that on rotation of the tubular rod 34 the spring 43 acts as a torsion spring transmitting between the tubular rod 34 and the non-rotatable jaw 33 the major part of the torque arising between the two due to the limited frictional resistance to rotation between them. With the brake in released position vibrations and shocks during the travel of the vehicle may give rise to momentaneous minute (individually insignificant) angular displacements of the rod 34 and the nut 35 thereon in relation to the non-rotatable spindle 36, but the spring 43 resiliently yields to such minute angular displacements of the rod 34 and automatically nullifies them by more or less immediately returning the rod 34 at least approximately back to its manually adjusted angular position in relation to the non-rotatable jaw 33, thereby effectively preventing such minute angular displacements of the rod 34 and the nut 35 as may be caused by vibrations or shocks from cumulating into a significant unintentional rotation of the rod 34 and the nut 35. This effect of the spring 43 eliminates the necessity of complicating the construction and operation of the slack adjuster by providing releasable means for positively locking the tubular rod 34 and nut 35 against rotation for securely preventing unintentional rotation of the nut 35 on the spindle 36 under the action of vibrations or shocks. Obviously a ratchet mechanism operable by means of handle bars like the handle bars 30 shown in Fig. 1 may be provided to make the tubular rod 34 and the nut 35 rotatable by hand from the sides of the car for not requiring the workmen to go under the car for operating the slack adjuster.

This application is a continuation in part of my U. S. application Ser. No. 286,113, filed May 5, 1952, now abandoned.

What I claim and desire to secure by Letters Patent is:

1. A slack adjuster for brakes on railway and like vehicles, comprising a brake rod having jaws at its ends for its connection in a brake rigging to form part thereof and comprising two rod parts axially displaceable in relation to each other and equipped each with one of said jaws, one of said rod parts being a threaded spindle, a nut threaded on said spindle, a tubular member coaxial with, and rotatable about its axis in relation to said spindle and the other of said two rod parts and connected with said nut and with said other rod part for rotating said nut on said spindle to effect relative axial adjustments of said spindle and said other rod part, and means for safeguarding against any significant unintentional displacement of said rotatable tubular member from any adjusted angular position thereof in relation to said other rod part being caused by such minor rotational movements of said rotatable nut and tubular member as in the absence of a positive locking thereagainst may be caused by shocks and vibrations, said means comprising a torsion spring and connections of its ends to said rotatable tubular member and to said other rod part, respectively, and allowing for minor rotational movements of said rotatable nut and tubular member in relation to said other rod part by said spring yielding torsionally to them and subsequently retrograding them, and at least one of said connections being in the nature of a constantly engaged slip friction clutch making it possible to rotate said rotatable tubular member by hand in relation to said other rod part to effect intentional relative axial adjustments of said spindle and said other rod part.

2. A slack adjuster as claimed in claim 1, and said nut and tubular member forming a rotatable section of said brake rod for transmitting braking stress between said other rod part and said spindle, said other rod part comprising a socket projecting from the jaw of said other rod part, said tubular member being inserted with one of its ends remote from said nut into said socket, coacting axial abutments in said socket and on said tubular member for transmitting braking stress between them, axially spaced friction clutch faces in said socket and on said tubular member, and said torsion spring being a coiled spring disposed in a compressed state between said axially spaced clutch faces and having its ends in frictional engagement with said clutch faces.

3. An automatic brake slack adjuster of the character described, comprising a two-part brake rod, the first part of said brake rod being a tubular rod part, the second part of said brake rod being a threaded spindle inserted with one end into said tubular rod part through one end thereof and axially displaceable therein, a tubular operating member axially displaceable and rotatable on said tubular rod part, spring means disposed between said tubular rod part and said operating member thereon axially urging said operating member toward the other end of said tubular rod part into a normal axial end position in relation thereto, a feed nut housed in said operating member and threaded on said spindle and movable thereon toward the other end thereof by said operating member on axial displacement thereof against the axial force of said spring means, a housing forming said one end of said tubular rod part, a coupling nut housed in said housing and threaded on said spindle in front of said feed nut as viewed from said one end of said spindle, said housing having a seat therein for said coupling nut to coact with for transmitting braking stress between said tubular rod part and said spindle, said operating member having a seat therein for said feed nut to coact with for coupling said spindle to said operating member on axial displacement thereof on said tubular rod part by the axial force of said spring means, abutment means connected with said operating member and moving together therewith on axial displacement thereof on said tubular rod part into said normal axial end position by the axial force of said spring means and so operatively related to said coupling nut in said housing that in said axial end position of said operating member said abutment means hold said coupling nut out of engagement with said seat therefor in said housing and couple said coupling nut rotationally to said operating member, and means resiliently yielding to and automatically retrograding any such unintentional minor rotational movements of said operating member and nuts in relation to said spindle and said tubular rod part as in the absence of a positive locking thereagainst may be caused by shocks and vibrations in said normal axial end position of said operating member, said means comprising a torsion spring formed by said spring means, and connections of the ends of said torsion spring to said operating member and to said tubular rod part, respectively, and at least one of said connections being in the nature of a constantly engaged slip friction clutch making it possible to rotate said operating member, when in said normal axial end position on said tubular rod part, by hand for rotating both said nuts in unison with one another on said spindle to effect intentional relative axial adjustments of said spindle and said tubular rod part.

References Cited in the file of this patent

UNITED STATES PATENTS

| | | |
|---|---|---|
| 2,031,704 | Gallusser | Feb. 25, 1936 |
| 2,225,001 | Browall | Dec. 17, 1940 |
| 2,246,873 | Browall | June 24, 1941 |